(12) United States Patent  
Ophardt et al.

(10) Patent No.: US 8,157,134 B2
(45) Date of Patent: Apr. 17, 2012

(54) PISTON WITH GUIDE RINGS

(75) Inventors: Heiner Ophardt, Vineland (CA); Charles S. Charron, Oakville (CA)

(73) Assignee: Gotohti.com Inc. (CA)

( * ) Notice: Subject to any disclaimer, the term of this patent is extended or adjusted under 35 U.S.C. 154(b) by 610 days.

(21) Appl. No.: 12/314,241

(22) Filed: Dec. 5, 2008

(65) Prior Publication Data
US 2010/0140879 A1   Jun. 10, 2010

(51) Int. Cl.
*F16J 9/12* (2006.01)
(52) U.S. Cl. .................... 222/321.7; 222/321.8
(58) Field of Classification Search .... 222/321.7–321.9, 222/383.1, 383.3, 384; 277/464, 465, 434–439
See application file for complete search history.

(56) References Cited

U.S. PATENT DOCUMENTS

| 5,165,577 | A | 11/1992 | Ophardt |
|---|---|---|---|
| 5,282,552 | A | 2/1994 | Ophardt |
| 5,373,970 | A | 12/1994 | Ophardt |
| 5,431,309 | A | 7/1995 | Ophardt |
| 5,489,044 | A | 2/1996 | Ophardt |
| 5,676,277 | A | 10/1997 | Ophardt |
| 5,836,482 | A | 11/1998 | Ophardt et al. |
| 5,975,360 | A | 11/1999 | Ophardt |
| 6,409,050 | B1 | 6/2002 | Ophardt et al. |
| 6,446,840 | B2 | 9/2002 | Ophardt et al. |
| 6,540,157 | B2 | 4/2003 | Ophardt |
| 6,557,736 | B1 | 5/2003 | Ophardt |
| 6,601,736 | B2 | 8/2003 | Ophardt et al. |
| 6,957,751 | B2 | 10/2005 | Ophardt |
| 7,198,175 | B2 | 4/2007 | Ophardt |
| 7,225,948 | B2 | 6/2007 | Ophardt et al. |
| 7,267,251 | B2 | 9/2007 | Ophardt |
| 7,303,099 | B2 | 12/2007 | Ophardt |
| 7,337,930 | B2 | 3/2008 | Ophardt et al. |
| RE40,319 | E | 5/2008 | Ophardt et al. |
| 2005/0161476 | A1 | 7/2005 | Ophardt |
| 2005/0205600 | A1 | 9/2005 | Ophardt |
| 2006/0175354 | A1 | 8/2006 | Ophardt |
| 2006/0237483 | A1 | 10/2006 | Ophardt |
| 2006/0249538 | A1 | 11/2006 | Ophardt |
| 2006/0261092 | A1 | 11/2006 | Ophardt |
| 2007/0257064 | A1 | 11/2007 | Ophardt |
| 2007/0284394 | A1 | 12/2007 | Ophardt |

*Primary Examiner* — Kevin P Shaver
*Assistant Examiner* — Donnell Long
(74) *Attorney, Agent, or Firm* — Thorpe North & Western LLP

(57) ABSTRACT

In a piston pump, the improvement of providing a locating disc on the piston extending radially outwardly from the piston to engage a chamber wall of the piston chamber and with the locating disc having an opening axially therethrough permitting fluid flow both in an inward direction and an outward direction.

20 Claims, 9 Drawing Sheets

PISTON WITH GUIDE RINGS

SCOPE OF THE INVENTION

This invention relates to a piston pump and, more particularly, to guide rings provided on a piston to assist in guiding the piston in axial sliding within a piston chamber.

BACKGROUND OF THE INVENTION

Piston pumps are well known in which a piston-forming element is reciprocally slidable coaxially within a piston chamber-forming member as for dispensing fluids from a reservoir. One typical such piston pump is described in U.S. Pat. No. 5,975,360 to Ophardt, issued Nov. 2, 1999, the disclosure of which is incorporated herein. In such pumps, sealing engagement between sealing surfaces of the piston and sealing surfaces in the chamber are required to provide advantageous pumping. The present inventor has appreciated that difficulties arise in such piston pumps when the piston forming element and the piston chamber may adopt positions in which they are not coaxially aligned. Such performance issues in severe cases can include loss of dosage, failure to prime and leakage. In such prior art pumps as taught by the above-noted patent, the failure of the piston-forming element to be properly maintained coaxially within the cylinder can result in discs carried by the piston be moved into positions in which they do not form an adequate seal with a cylindrical wall of the piston chamber.

SUMMARY OF THE INVENTION

To at least partially overcome these disadvantages of previously known devices, the present invention provides locating discs on the piston extending radially outwardly from the piston to engage a chamber wall of the piston chamber and with the locating discs having an opening axially therethrough permitting fluid flow both in an inward direction and an outward direction. Preferably, the locating disc is provided proximate a flexing disc carried on the piston and adapted to resiliently engage the chamber wall to form a fluid impermeable seal therewith preventing fluid flow in at least one of an inward direction and an outward direction.

An object of the present invention is to provide an improved locating disc on a piston-forming element to facilitate maintaining the piston forming element coaxially within a piston chamber.

Another object is to provide an improved piston-forming element for a pump for dispensing fluids in which the piston-forming element is received in a piston chamber-forming member having a cylindrical chamber, and with the improvement arising in providing an improved locating disc to engage the chamber wall and guide the piston-forming member in sliding axially centered within the chamber.

In one aspect, the present invention provides a pump for dispensing fluid from a reservoir, comprising:

a piston chamber-forming member having a cylindrical chamber, said chamber having a chamber wall, an outer open end and an inner end in fluid communication with the reservoir;

a piston-forming element slidably received in the chamber extending outwardly from the open end thereof;

said the piston-forming element being generally cylindrical in cross-section with a central axially extending stem having an inner end in the chamber and extending from the inner end outwardly to an outer end;

a first seal disc extending radially outwardly from the stem proximate the inner end, the first seal disc having an elastically deformable edge portion proximate the chamber wall circumferentially thereabout, wherein in operation: (a) on the piston-forming element sliding outwardly in said chamber, the first seal disc substantially preventing fluid flow past the first seal disc in an inward direction, and (b) on the piston-forming element sliding inwardly into the chamber the first seal disc elastically deforms away from the chamber wall to permit fluid flow past the first seal disc in an outward direction;

a first locating disc on said stem located axially on the stem proximate to the first seal disc, the first locating disc extending radially outwardly from the stem to an edge portion which engages the chamber wall over a circumferential sector greater than 180 degrees to guide the piston-forming element in sliding axially centered and aligned within the chamber, the first locating disc having an opening axially therethrough permitting fluid flow past the first locating disc in both an inward direction and an outward direction.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 5:
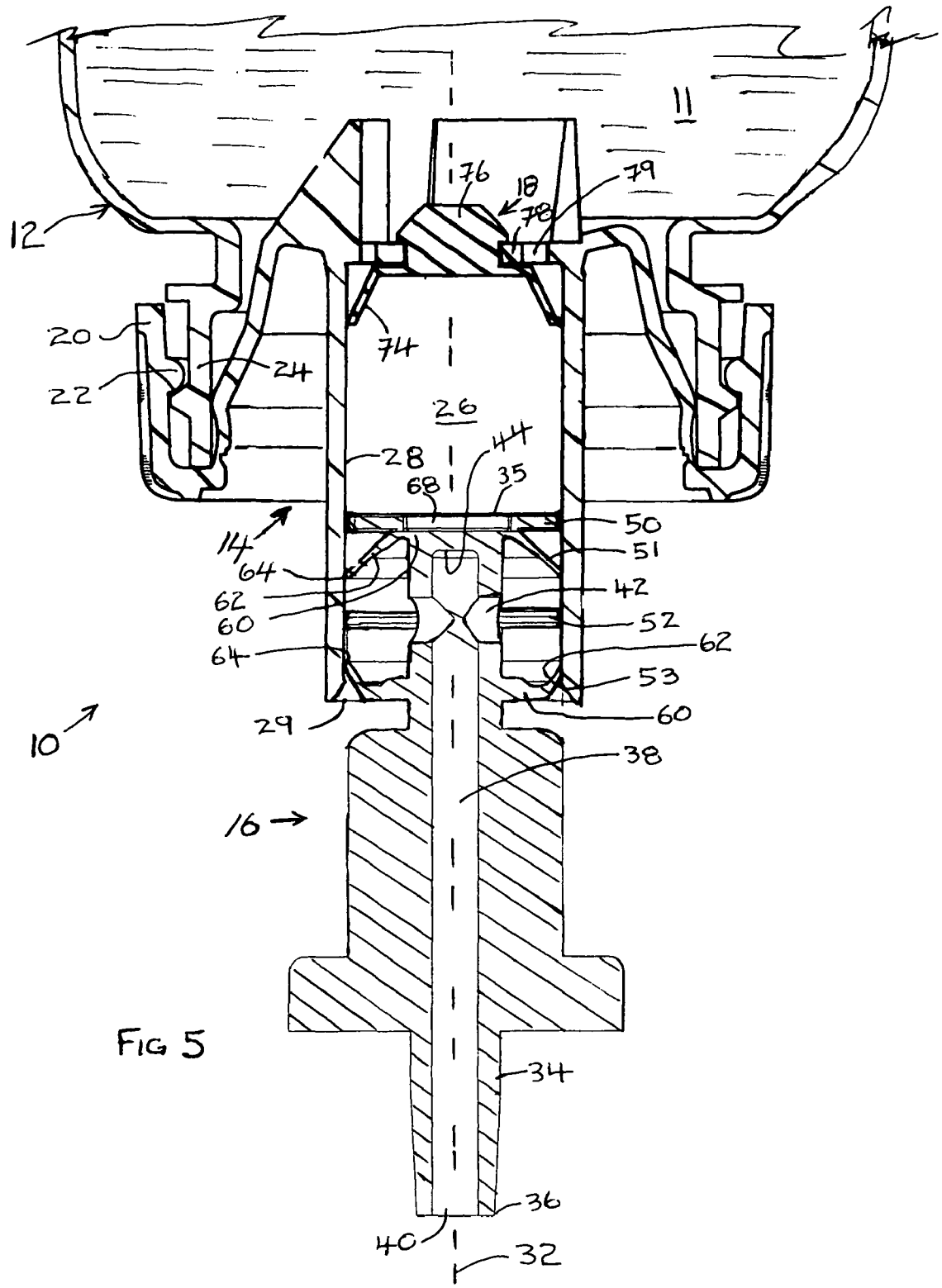
FIG. 5 is a cross-sectional side view showing the piston of FIG. 1 cross-sectioned along cross-section 5-5' in FIG. 3 as shown received inside a piston chamber-forming member coupled to a fluid containing container.

Reference is made first FIG. 5 showing in cross-section a pump assembly 10 secured to a reservoir container 12 containing a fluid 11. The pump assembly 10 includes a piston chamber-forming body 14, a piston 16 and a one-way valve 18.

The body 14 carries an outer cylindrical portion 20 carrying threads 22 to cooperate with threads formed on the threaded neck 24 of the container 12. The body 14 has an inner cylindrical portion providing a cylindrical piston chamber 26 radially inside the cylindrical wall 28. The chamber 26 has an outer open end 29 and an inner end 30 in communication with fluid 11 in the container 12.

The piston 16 is reciprocally axially slidable in chamber 26 between a retracted position and an extended position so as to draw fluid from within the container 12 and dispense out of outer open end 29. The body 14, and notably its chamber 26, are coaxial about a central axis 32, and the piston 16 is designed for preferred operation to be coaxial within the chamber 26 about the axis 32.

The piston 16 has an elongate stem 34 with an inner end 35 and an outer end 36. The inner end 35 is located within the chamber 26 and the outer end 36 is accessible via the outer open end 29 of the chamber 26 for engagement to slide the piston 16 within the chamber 26 to dispense fluid.

The stem 34 comprises a hollow tubular member and can be seen to have an inner passageway 38 which extends coaxially within the stem to provide communication between an outlet 40 at the outer end 36 of the stem and radially extending inlets 42 on the stem 34 axially inwardly on the stem 34 from the outer end 36 toward the inner end 35. The passageway 38 may be characterized as a blind bore open at the outlet 40 and closed at a blind inner end 44. Each inlet 42 may be characterized as a conduit extending radially through a wall of the tubular stem 34 opening into the passageway 38.

The stem 34 carries a number of different discs 50 to 56 which extend radially outwardly from the stem 34, as best seen in FIGS. 1 to 4.

Two seal discs are provided, an inner seal disc 51 and an outer seal disc 53. Each inlet 42 is disposed between the inner seal disc 51 and the outer seal disc 53.

Four locating discs are provided, an inner first locating disc 50, a second locating disc 52, a third locating disc 54 and a fourth locating disc 55. The first locating disc 50 is located at the inner end 35 of the stem 34 inwardly of the inner seal disc 51. The second locating disc 52 is disposed between the inner seal disc 51 and the outer seal disc 53. The third locating disc 54 is located axially outwardly of the outer seal disc 53. The fourth locating disc 55 is located axially outwardly of the third locating disc 54.

An engagement disc 56 is provided located axially outwardly of the fourth locating disc 55. The engagement disc 56 is for engagement to move the piston 16 inwardly and outwardly.

Four axially extending locating flanges 58 are provided spaced circumferentially about the stem and extending axially from the engagement disc 56 inwardly to the third locating disc 54 to bridge the engagement disc 56, the fourth locating disc 55 and the third locating disc 54.

As seen in FIG. 5, each of the seal discs 51 and 53 includes a radially inner central disc portion 60 and a radially conical outer portion 62. The conical outer portion 62 extends axially and radially outwardly from the central disc portion 60 to a circumferential edge 64. The conical outer portion 62 engages the cylindrical chamber wall 28 of the piston chamber 26 circumferentially thereabout. The conical outer portion 62 is elastically deformable radially inwardly away from the chamber wall 28 to permit fluid flow in the chamber 26 therepast when the pressure differential across the seal disc is sufficiently great to overcome the inherent bias by which the conical outer portion 62 of the seal disc is resiliently urged radially outwardly into the wall 28 of the piston chamber 26. With respect to the inner seal disc 51, the conical outer portion 62 extends from the central disc portion 60 radially outwardly and axially outwardly to the edge 64. The inner seal disc 51 permits fluid flow outwardly past the inner seal disc 51 by elastic deformation of the edge 64 of the conical outer portion 62 away from the chamber wall 28. The inner seal disc 51 is adapted to prevent fluid flow past the inner seal disc 51 in an inward direction.

The outer seal disc 53 is similar to the inner seal disc, however, the conical outer portion 62 of the outer seal disc 53 extends radially outwardly and axially inwardly. The outer seal disc 53 is adapted to prevent fluid flow past the outer seal disc 53 in an outward direction.

Figure 6:
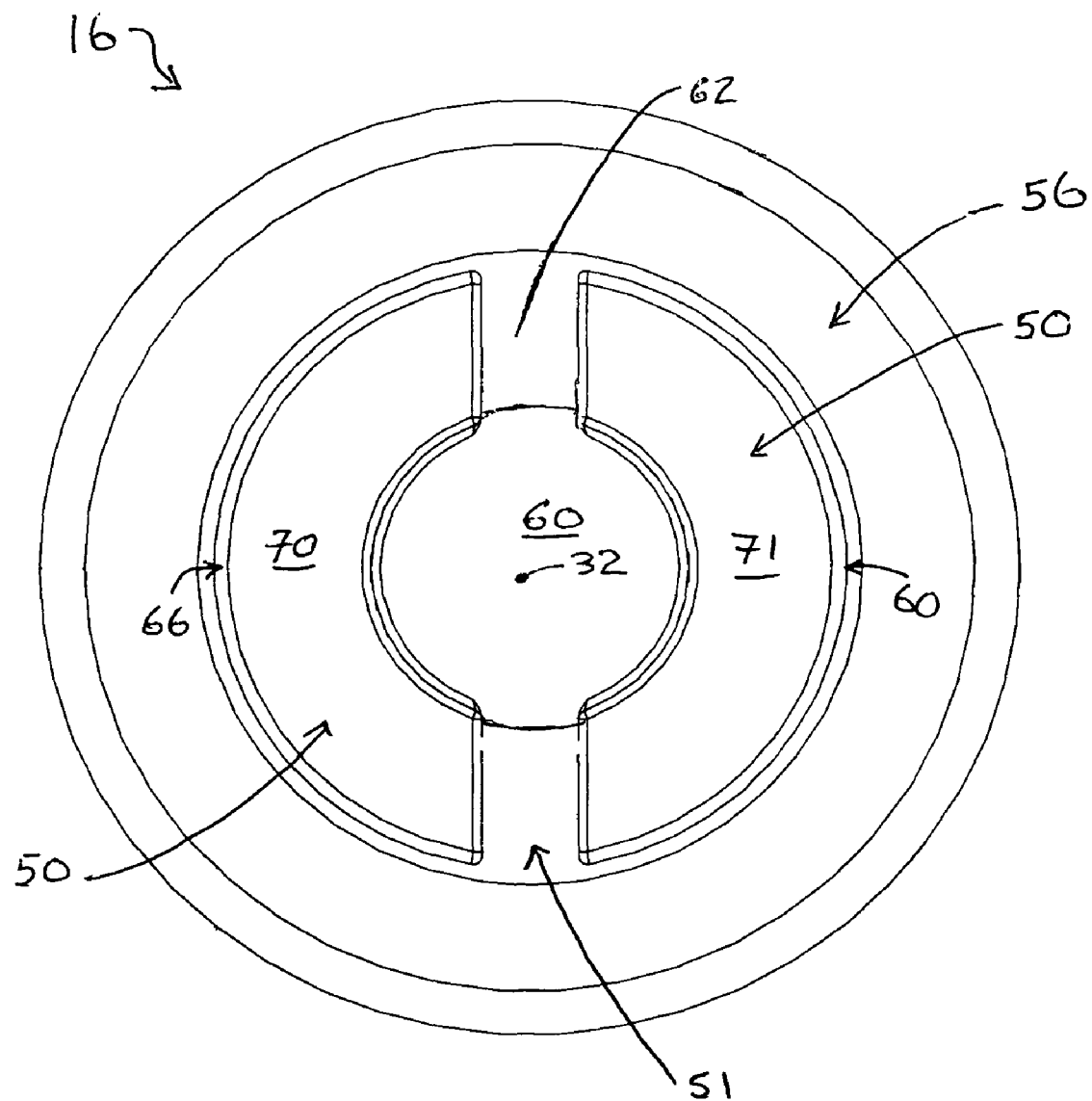
FIG. 6 is an end view of the inner end of the piston shown in FIG. 1.

Each of the first and second locating discs 50 and 52 may be characterized as comprising a disc which extends radially outwardly from the stem 34 to an edge 66 which engages the chamber wall 28 for sliding engagement of the edge 66 in engagement with the chamber wall 28 to guide the piston 16 in sliding axially centered and aligned within the chamber 26. As shown, each of the first and second locating discs 50 and 53 have an opening 68 axially therethrough permitting fluid flow past each of the first and second locating disc 50 and 52 in both an inward direction and an outward direction. The opening 68 is in the form of a slot axially through the locating disc from the edge portion 64 radially inwardly. In the case of the first locating disc 50 the slot extends diametrically through the stem 34 and may be seen, for example, in FIG. 6 in end view to divide the inner seal disc 51 into two disc halves 70 and 71. As seen in FIG. 6 in end view, the edge 66 of each disc half 70 and 71 extend a circumferential extent of about 165 degrees about the axis 32 where it engages the chamber wall 28 such that together the combined circumferential extent of the edge 66 of the seal disc 51 is about 330 degrees circumferentially about the axis 32 where the edge 66 engages the chamber wall 28.

The third and fourth locating discs 54 and 55 each extend radially outwardly from the stem 34 to an edge 66 which engages the circumferential wall 28 circumferentially 360 degrees about the axis 32 to guide the piston 16 in sliding axially centered and aligned with the chamber 26.

Each of the four locating flanges 58 has an edge 72 which extends axially to engage the chamber wall 28 in cooperatively assisting in guiding the piston 16 in sliding axially centered and aligned within the chamber 26.

The one-way valve 18 comprises a unitary piece of resilient material having a resilient, flexible, annular rim 74 for engagement with the side wall 28 of the chamber 26. The one-way valve 18 is integrally formed with a shouldering button 76 which is secured in a snap-fit inside a central opening through an inner end wall 78 of the chamber 26. Radially outward of the central opening a number of passage openings 79 are provided through the end wall 78 providing communication between the container 12 and the chamber 26.

Depending upon the pressure differential across the annular rim 74, the one-way valve 18 will either permit flow of fluid outwardly from within the container 12 through the passage opening 79 from the container 12 to the chamber 26 or prevent fluid flow of fluid inwardly from the chamber 26 into the container 12.

Operation of the pump assembly 10 of FIGS. 1 to 6 is now described. In a withdrawal stroke, on sliding the piston 16 outwardly relative to the chamber 26, the inner seal disc 51 prevents fluid flow inwardly therepast such that a vacuum is created inwardly of the inner seal disc 51 which causes the one-way valve 18 to open drawing fluid from the container 12 outwardly past the one-way valve 18 into the chamber 26. In a retraction stroke, on moving the piston 16 inwardly into the chamber 26, pressure developed between the one-way valve 18 and the inner seal disc 51 closes the one-way valve 18 and deflects the inner seal disc 51 permitting fluid to flow outwardly past the inner seal disc 51 to in between the inner seal disc 51 and the outer seal disc 53. The outer seal disc 53 prevents passage of fluid outwardly therepast so that fluid from between the inner seal disc 51 and the outer seal disc 53 flows via the inlets 42 into the inner passageway 38 and via the inner passageway 38 to the outlet 40 at the outer end 36 of the stem from which fluid is discharged for use.

Each of the first and second locating discs 50 and 52 permit fluid flow axially outwardly therepast via their slot openings 68. Neither of split first locating disc 50 or the split second locating disc 52 impede the ability of fluid to flow axially within the chamber 26 inwardly or outwardly therepast or to enter the inlets 42.

In the case of the second locating disc 52, the second locating disc 52 is located axially on the stem 34 at the same axial location as the inlets 42. While not necessary, the openings 68 on the second locating disc 52 are shown to be in circumferential alignment with the inlets 42 on the stem such that the openings 68 do not prevent fluid between the seal disc 51 and seal disc 52 from entering the inlets 42.

Each of the first and second locating discs 50 and 52 have their edges 66 sized to closely match in size the inside cylindrical chamber wall 28 of the chamber 26 so as to assist in guiding the piston 16 maintained coaxially within the chamber 26. Maintaining the piston coaxially within the chamber 26 is particularly advantageous such that each of the inner seal disc 51 and the outer seal disc 53 may be maintained substantially coaxially within the chamber 26 which is preferred for enhanced performance and operation of the pump assembly. Insofar as the piston 16 notably, the inner end 35 of the piston 16 and particularly the inner seal disc 51 and the outer seal disc 53 may come to be disposed in positions which are not coaxial with the chamber 26, then the inner seal disc 51 and the outer seal disc 53 may have their edge become disengaged from the wall 28 of the chamber resulting in loss of seal leakage and failure of the pump to efficiently operate. Providing the first and second locating discs 50 and 52 to be close to the seal discs 51 and 53 is advantageous.

As seen in FIG. 5 the first locating disc 50 is shown as joined to and, in effect, comprising an axially inner segment of the central disc portion 60 of the inner seal disc 51 thus locating the first locating disc 50 closely adjacent to the inner seal disc 51 as is advantageous for maintaining the inner seal disc 51 in coaxial location within the chamber 34.

In moving the piston 16 outwardly relative to the chamber 26, it is to be appreciated that the pump assembly 10 will remain operative provided the outer seal disc 53 remains in engagement with the chamber wall 28 of the chamber 26. Thus, the outer seal disc 53 is preferably not to exit the outer open end 29 of the chamber 26 and a fully extended position may comprise a position in which the outer seal disc 53 is proximate to the outer open end 29 of the chamber 26 with the third locating disc 54 to be out of the chamber 26 as seen in FIG. 5. In such a position merely the first locating disc 50, inner seal disc 51, the second locating disc 52 and the outer seal disc 53 are engaged with the walls 28 of the chamber 26. Providing the two axially spaced locating discs 50 and 52 in engagement with the chamber walls 26 at all times in the stroke of the piston 16 is advantageous to assist in maintaining the piston 16 coaxially arranged within the chamber 26. Insofar as the piston 16 is moved inwardly from the fully extended position, then to varying degrees, each of the third and fourth locating discs 54 and 55 and the locating flanges 58 will come to be engaged within the chamber 26 and additionally assist in maintaining the piston 16 coaxially within the chamber 26.

In pumping operation, since there is no fluid flow in the chamber 26 axially outwardly of the outer seal disc 53 and radially outwardly of the stem 34, the third and fourth locating discs 54 and 55 can have their edge portions engage the wall 28 360 degrees circumferentially thereabout, as to substantially prevent fluid flow inwardly or outwardly although this is not necessary.

The preferred embodiment of FIGS. 1 to 6 show the provision of 2 locating discs which permit fluid flow axially therepast, however, this is not necessary. Providing at least one locating disc permitting fluid flow therepast can assist in maintaining the piston 16 coaxially within the chamber 26, whether such one locating disc is the first locating disc 50 or the second locating disc 52 as shown or a compatible locating disc provided on the stem 34 at some axial position axially inward of the outer seal disc 53.

Figure 7:
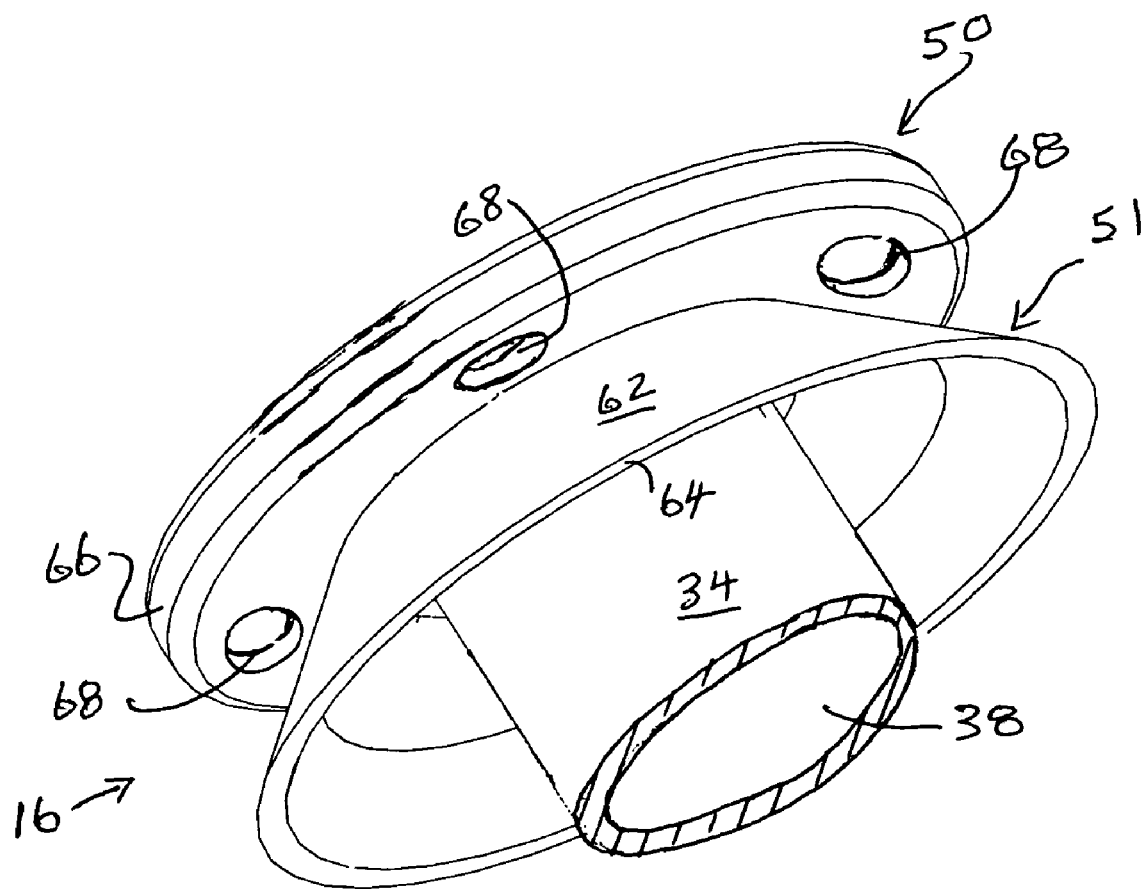
FIG. 7 is a schematic pictorial view of an inner end of a piston similar to that shown in FIGS. 1 to 6 but with an alternative arrangement for the openings through the locating disc.

Reference is made to FIG. 7 which illustrates an inner end of a piston 16 carrying a first locating disc 50 and an inner seal disc 51, similar to the piston 16 shown in FIGS. 1 to 6 but in which the openings 68 axially through the inner locating disc 50 comprise circular openings disposed intermediate the stem 34 and the outer edge 66. In the embodiment of FIG. 7 the outer edge 66 of the first locating disc 50 engages with the chamber wall 28 360 degrees about the axis 32, as may be advantageous for maintaining the piston 16 coaxial within the chamber 26.

Figure 8:
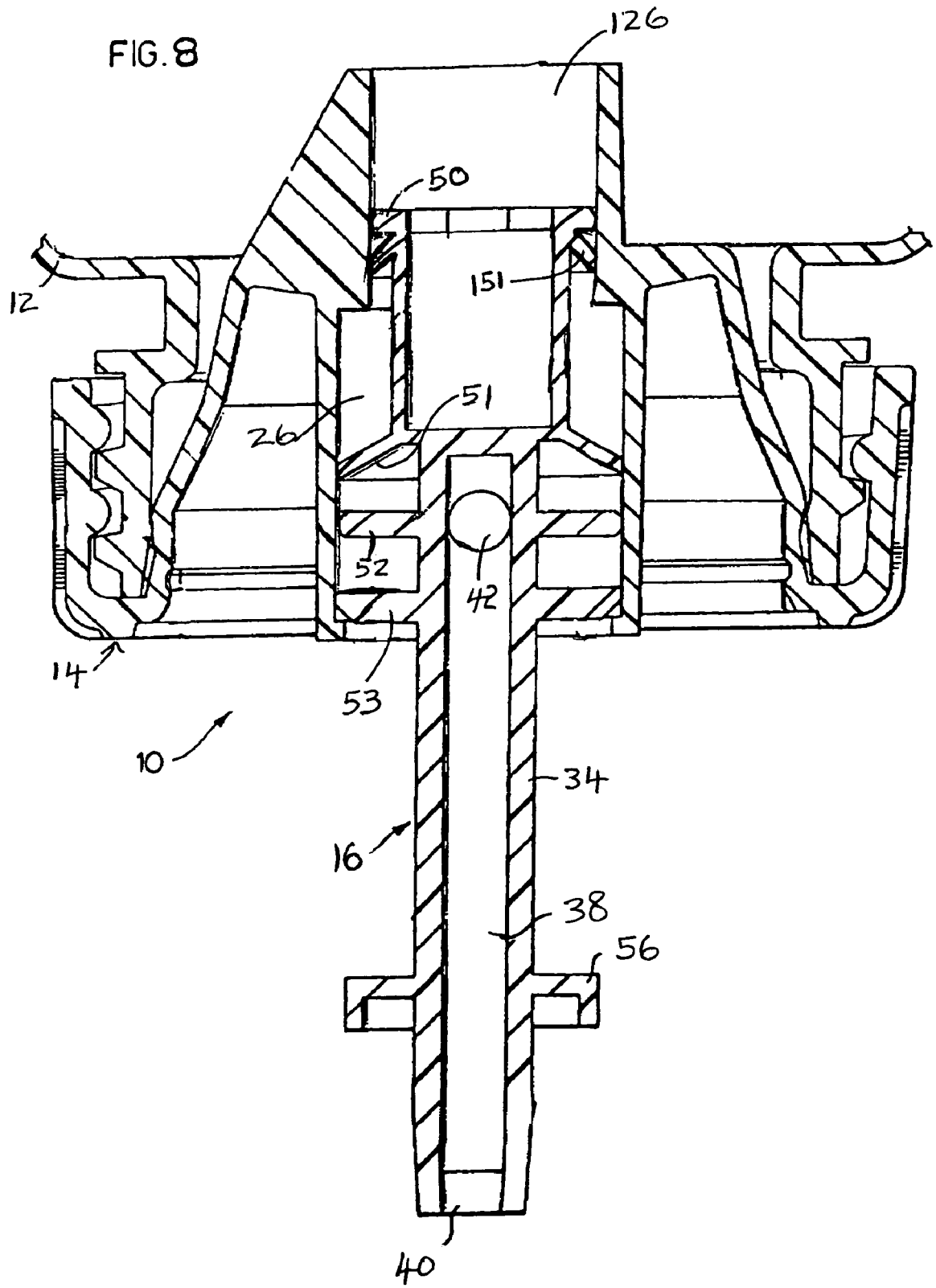
FIG. 8 is a cross-sectional side view similar to FIG. 5 but of a second embodiment of the pump assembly in accordance with the present invention.

Reference is made to FIG. 8 which shows in cross-section similar to FIG. 5, a second embodiment of a piston pump assembly 10, in which three seal disc are provided in a stepped chamber so as to avoid the need for the separate one way 18 in FIG. 5. The piston chamber forming member 14 is stepped in having a larger diameter outer chamber 26 opening into a coaxial smaller diameter inner chamber 126. As seen, the piston 16 carries on its stem 34 an inner seal disc 51, a second locating disc 52, and an outer seal disc 53 with the second locating disc 52 and the inlets 42 intermediate the seal discs 51 and 53. The inner seal disc 51, second locating disc 52 and outer seal disc 53 are received within a cylindrical outer chamber 26. The piston 16 extend inwardly from the outer chamber 26 into a coaxial inner chamber 126 in which an inlet seal disc 151 and a first locating disc 50 are provided. The inlet seal disc 151 permits fluid flow outwardly therepast in the inner chamber 126 but prevents fluid flow inwardly therepast in the inner chamber. In FIG. 8, moving the piston 16 inwardly dispenses fluid from out of the outlet 40.

Figure 9:
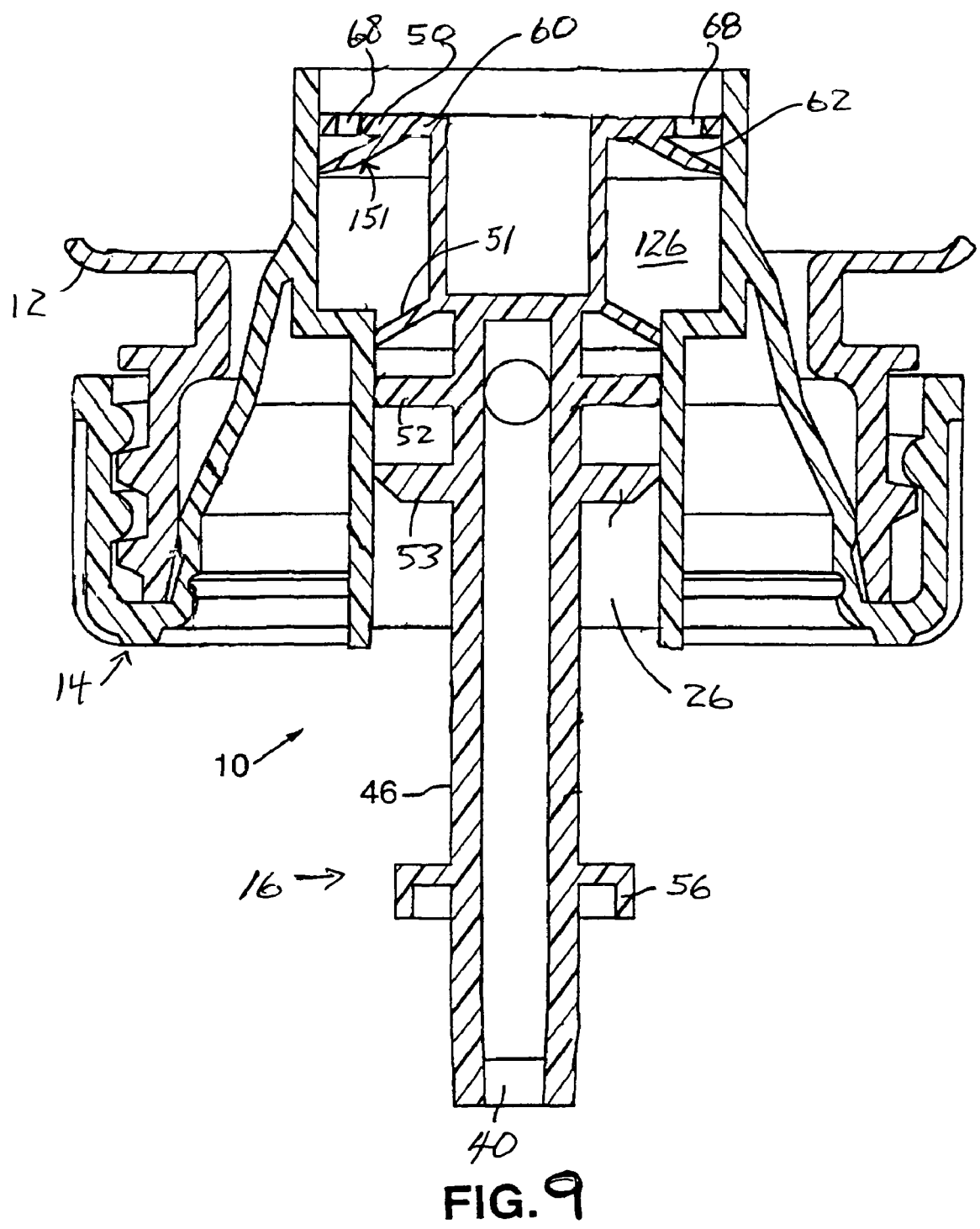
FIG. 9 is a cross-sectional side view similar to FIG. 5 but of a third embodiment of a pump assembly in accordance with the present invention.

Reference is made to FIG. 9 which shows in cross-section a third embodiment of a piston pump assembly 10 which is the same as the embodiment of FIG. 8 but with the inner chamber 126 being of a larger diameter than the outer chamber 26. As in FIG. 8 in FIG. 9 the piston 16 has three seal disc 151, 51 and 53 and two locating disc 50 and 52. In FIG. 9 moving the piston 16 outwardly dispenses fluid from out of the outlet 40. FIG. 9 also shows the inlet seal disc 151 and the first locating disc 50 being formed with the first locating disc 50 forming an innermost section of the central disc portion 60 of the inlet seal disc 151 from which a conical outer portion 62 depends. Axial passage openings 68 similar to those shown in FIG. 7 extend axially through the first locating disc 50 in FIG. 9.

In FIGS. 8 and 9, both the inner seal disc 51 and the inlet seal disc 151 are shown to have an annular outer portion 62 capable of being deflected away from the wall of their respective chamber to permit fluid flow outwardly therepast. The outer seal disc 53 is shown as a more rigid disc member which engages the wall of the outer chamber 26 as, for example, to prevent fluid flow therepast. The outer seal disc 53 in FIGS. 8 and 9 is advantageous to further assist in maintaining the piston 16 coaxial within the chamber 26, but is generally less preferred for providing advantageous sealing as is to be generally provided with a seal disc such as outer seal disc 53 in FIGS. 1 to 6. The outer seal disc 53 of FIGS. 1 to 6 could be substituted for the outer seal disc 53 in FIGS. 8 and 9.

Figure 1:
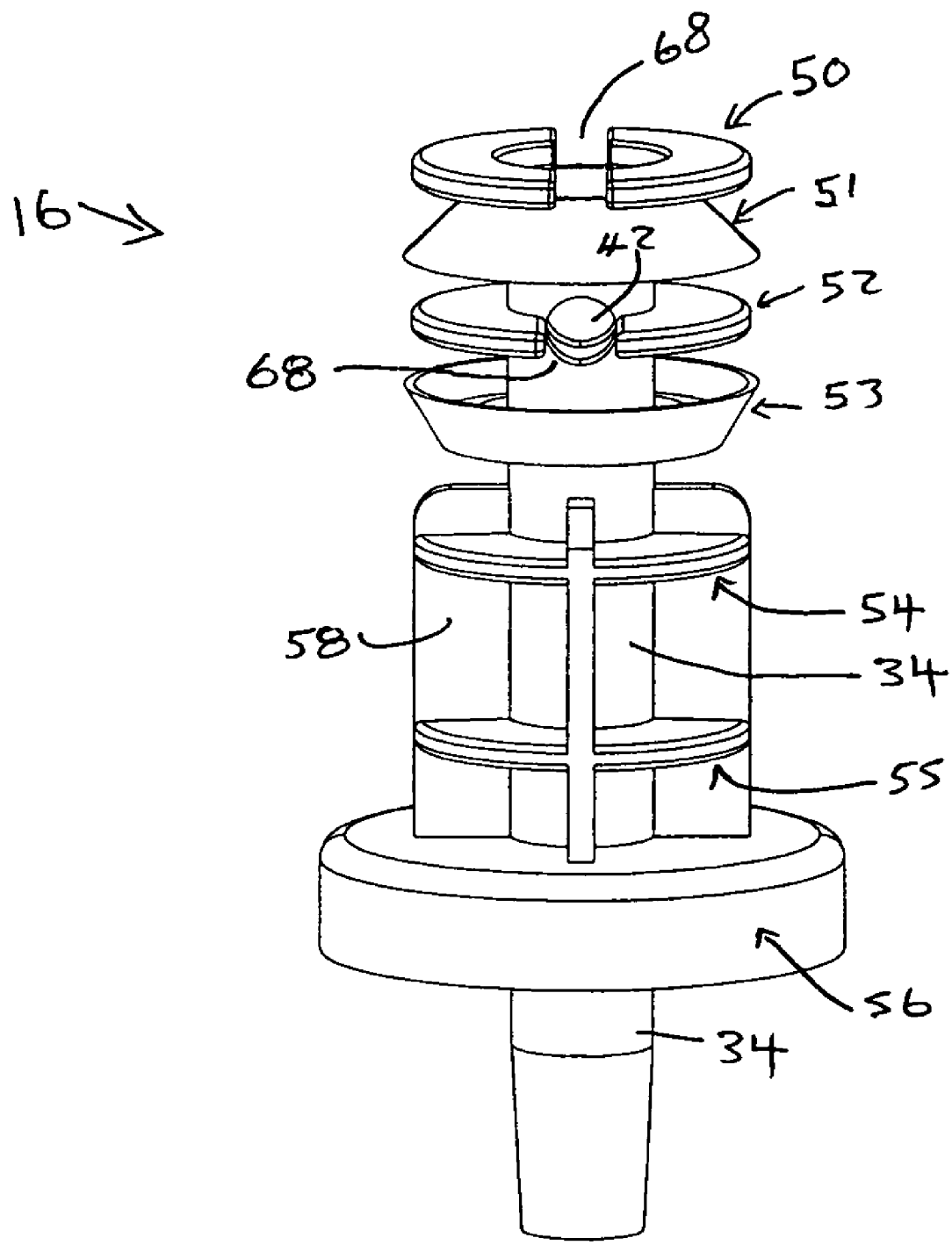
FIG. 1 is an upper perspective view of the front of a piston-forming element in accordance with the first embodiment of the present invention.
Figure 2:
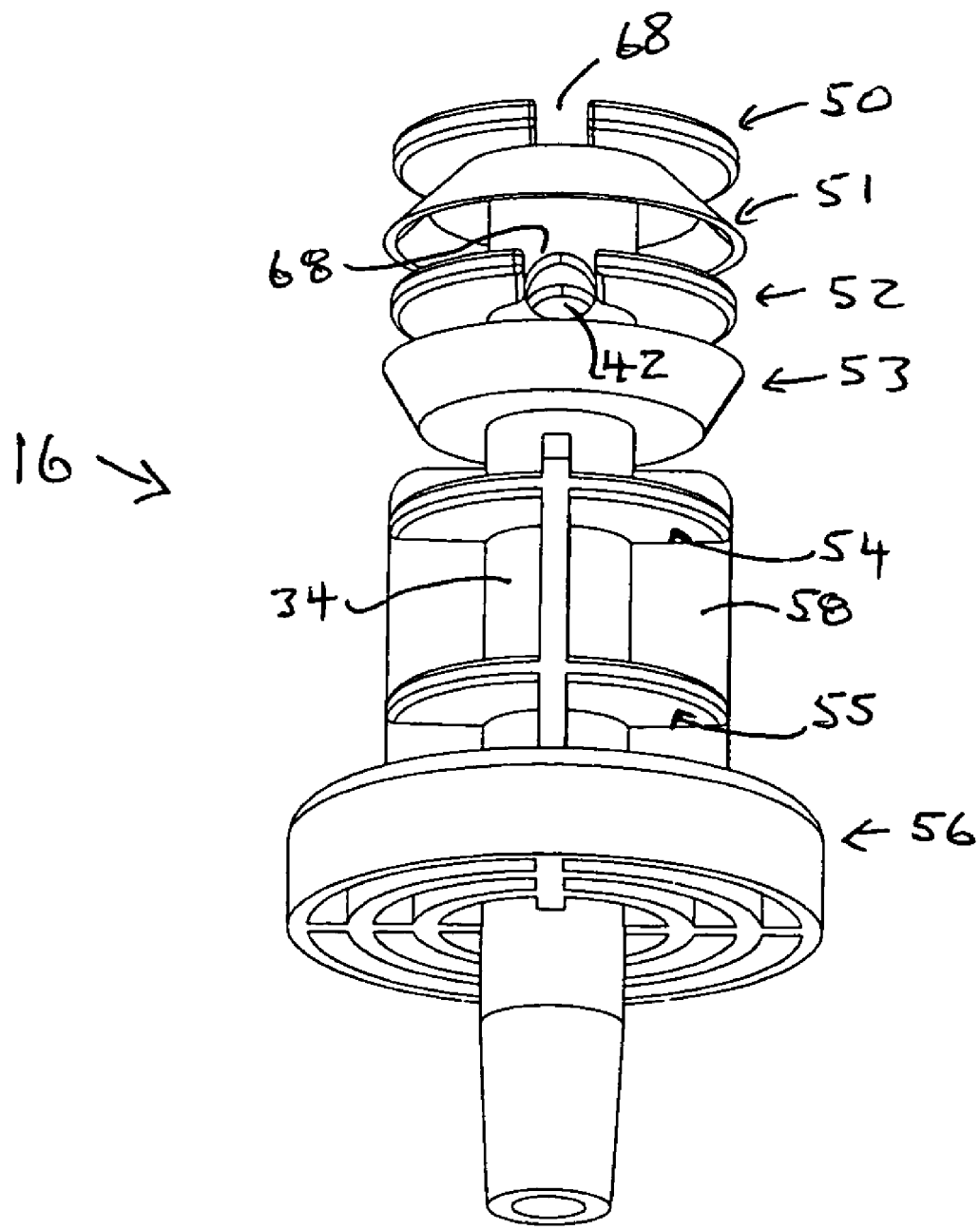
FIG. 2 is a bottom perspective view of the front of the piston-forming element shown in FIG. 1.
Figure 3:
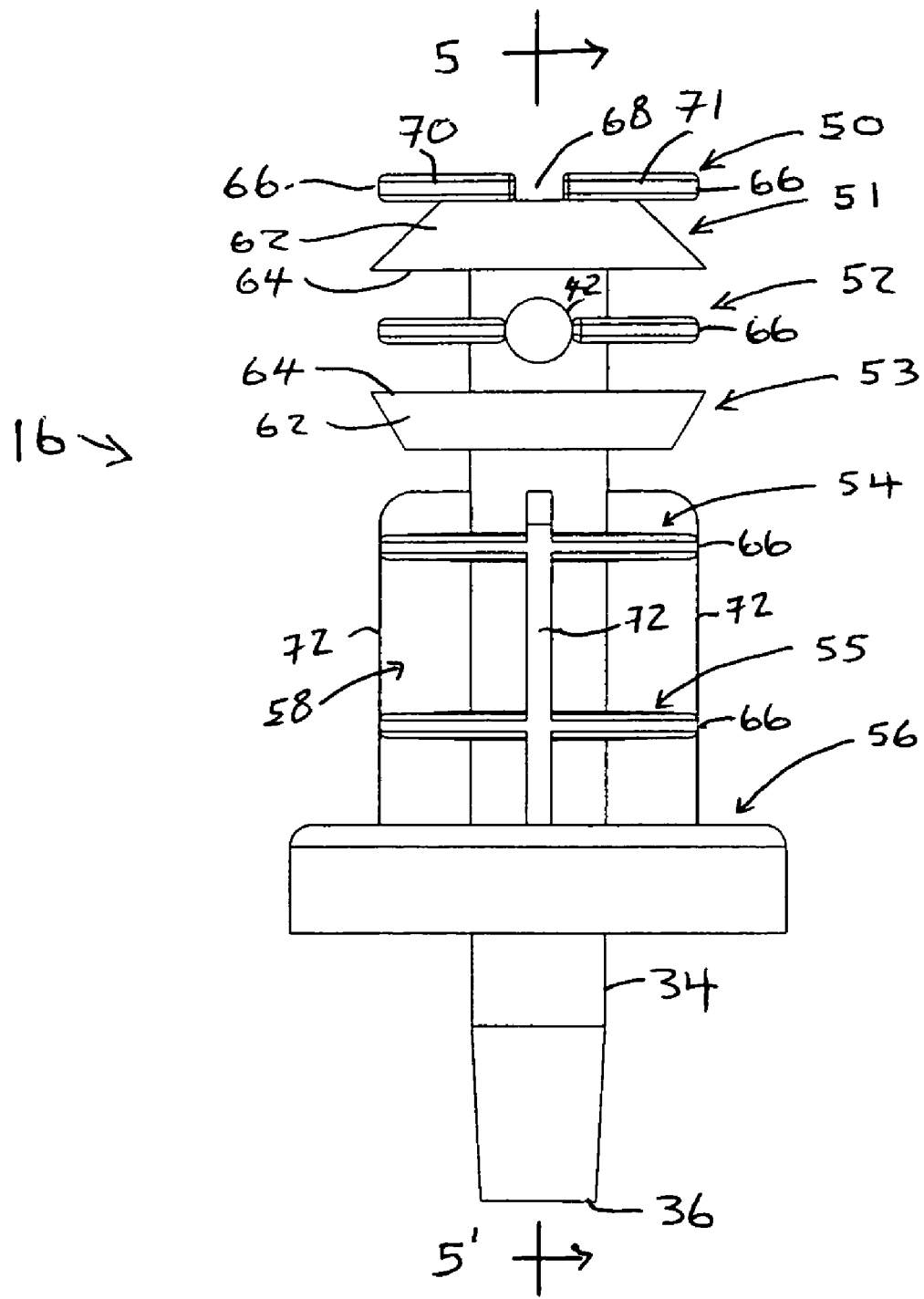
FIG. 3 is a front view of the piston-forming element of FIG. 1.
Figure 4:
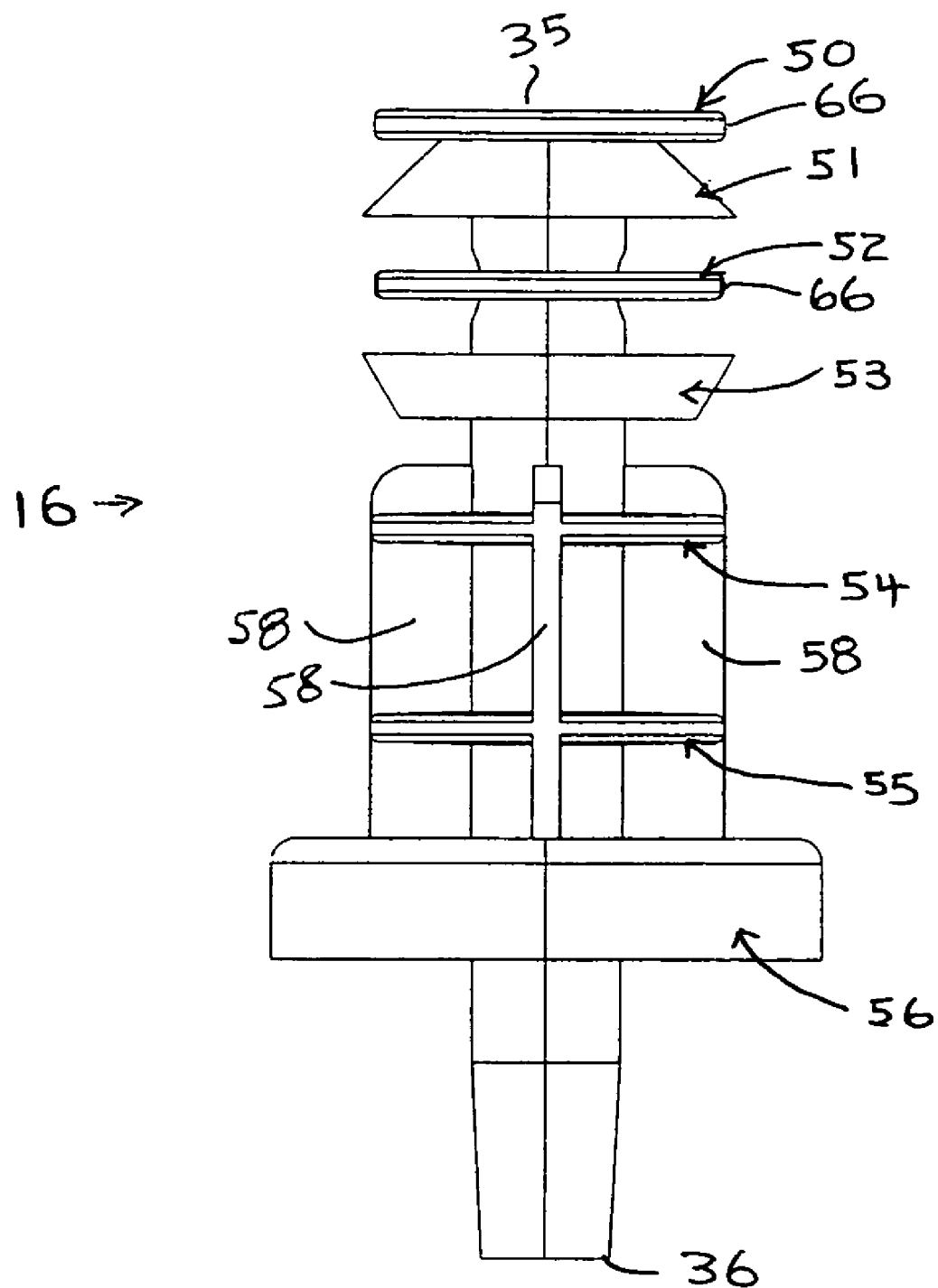
FIG. 4 is a side view of the piston-forming element shown in FIG. 1 normal to the front view shown in FIG. 3.

In the embodiment of FIG. 1, the locating disc 52 engages the chamber wall 28 about 330 degrees about the central axis 32. In the embodiment of FIG. 7, the locating disc 50 engages the chamber wall 360 degrees about the circumference of the chamber. It is preferred that there is as great as possible a circumferential engagement of each locating discs 50 and 52 with the chamber wall 28 yet which may permit fluid to flow inwardly and outwardly therepast. Having the locating discs 50 and 52 engage the chamber wall 28 preferably is about a circumferential extent of at least 180 degrees and, more preferably, at least 270 degrees.

Each of the preferred embodiments shows an arrangement with two locating discs 50 and 52 which permit fluid flow inwardly and outwardly. This is not necessary. Merely one of the locating discs 50 or 52 may be provided, however, it is to be appreciated that two or more such locating discs which permit fluid flow therepast may be provided. The locating discs which are to permit fluid flow therepast, of course, need only to be located at positions where fluid flow therepast is desired and needed for the proper operation of the pump and in the embodiments shown, this is indicated as being on an inward side of the outer seal disc 53, however, it is to be appreciated that the relative location of the various seal discs and locating discs may vary depending upon the nature and configuration of any particular pump.

The pumps shown in the preferred embodiments are advantageously injection moulded as a single element from plastic as can be advantageous towards reducing costs.

While the invention has been described with reference to preferred embodiments, many modifications and variations will now occur to persons skilled in the art. For a definition of the invention, reference is made to the following claims.

We claim:

1. A pump for dispensing fluid from a reservoir, comprising:
a piston chamber-forming member having a cylindrical chamber, said chamber having a chamber wall, an outer open end and an inner end in fluid communication with the reservoir;
a piston-forming element slidably received in the chamber extending outwardly from the open end thereof;
said the piston-forming element being generally cylindrical in cross-section with a central axially extending stem having an inner end in the chamber and extending from the inner end outwardly to an outer end;
a first seal disc extending radially outwardly from the stem proximate the inner end, the first seal disc having an elastically deformable edge portion proximate the chamber wall circumferentially thereabout, wherein in operation: (a) on the piston forming element sliding outwardly in said chamber, the first seal disc substantially preventing fluid flow past the first seal disc in an inward direction, and (b) on the piston forming element sliding inwardly into the chamber the first seal disc elastically deforms away from the chamber wall to permit fluid flow past the first seal disc in an outward direction;
a first locating disc on said stem located axially on the stem proximate to the first seal disc, the first locating disc extending radially outwardly from the stem to an edge portion which engages the chamber wall over a circumferential sector greater than 180 degrees to guide the piston-forming element in sliding axially centered and aligned within the chamber, the first locating disc having an opening axially therethrough radially outwardly of the stem permitting fluid flow past the first locating disc in both an inward direction and an outward direction.

2. A pump as claimed in claim 1 wherein the first locating disc is on the stem axially inward of the first seal disc.

3. A pump as claimed in claim 1 wherein the first locating disc is on the stem axially outward of the first seal disc.

4. A pump as claimed in claim 2 including:
a second locating disc on the stem proximate the first seal disc axially outward of the first seal disc,
the second locating disc extending radially outwardly from the stem to engage said chamber wall and guide the piston-forming element in sliding axially centered and aligned within the chamber, the second locating disc having an opening axially therethrough permitting fluid flow past the first locating disc in both an inward direction and an outward direction.

5. A pump as claimed in claim 4 wherein:
the stem is hollow having a central passageway open at the outer end forming an outlet and closed at an innermost blind end,
a second seal disc extending radially outwardly from the stem spaced axially outwardly from the first seal disc, the second seal disc engaging the chamber wall circumferentially thereabout to prevent fluid flow past the second seal disc in an outward direction on sliding of said piston-forming element inwardly and outwardly,
an inlet located on the stem between the first seal disc and the second seal disc in communication with the passageway via a short channel extending radially inward from the inlet to the passageway,
the second locating disc located on said stem between the first seal disc and the second seal disc.

6. A pump as claimed in claim 5 wherein the second locating disc is at the same location axially as the inlet,
the second locating disc having an edge portion proximate the chamber wall substantially circumferentially thereabout,
the opening axially through the second locating disc comprising a slot axially through the second locating disc from the an edge portion radially toward the stem and opening into the inlet.

7. A pump as claimed in claim 3 wherein:
the stem is hollow having a central passageway open at the outer end forming an outlet and closed at an innermost blind end,
a second seal disc extending radially outwardly from the stem spaced axially outwardly from the first seal disc, the second seal disc engaging the chamber wall circumferentially thereabout to prevent fluid flow past the second seal disc in an outward direction on sliding of said piston forming element inwardly and outwardly,
an inlet located on the stem between the first seal disc and the second seal disc in communication with the passageway via a short channel extending radially inward from the inlet to the passageway,
the first locating disc on said stem between the first seal disc and the second seal disc.

8. A pump as claimed in claim 7 wherein the first locating disc is at the same location axially as the inlet,
the first locating disc having an edge portion proximate the chamber wall substantially circumferentially thereabout,
the opening axially through the first locating disc comprising a slot axially through the first locating disc from the edge portion radially toward the stem and opening into the inlet.

9. A pump as claimed in claim 1 wherein the first locating disc having an edge portion proximate the chamber wall substantially circumferentially thereabout, the opening axially through the first locating disc comprising a slot axially through the locating disc extending from the edge portion radially toward the stem.

10. A pump as claimed in claim 1 wherein the first locating disc having an edge portion proximate the chamber wall substantially circumferentially thereabout, the opening axially through the first locating disc comprising a plurality of slots axially through the first locating disc each extending from the edge portion radially toward the stem diametrically located relative the stem.

11. A pump as claimed in claim 2 wherein the first locating disc having an edge portion proximate the chamber wall substantially circumferentially thereabout, the opening axially through the first locating disc comprising a plurality of slots axially through the first locating disc each extending from the an edge portion radially toward the stem diametrically located relative the stem.

12. A pump as claimed in claim 7 wherein axially outwardly of the second seal disc the stem carrying one or more locating discs.

13. A pump as claimed in claim 1 including an engagement member on said stem outward of the chamber forming element for engagement to move the piston forming element reciprocally inwardly and outwardly relative the chamber.

14. A pump as claimed in claim 1 wherein the edge portion of the first locating disc engages the chamber wall over a circumferential sector greater than 270 degrees.

15. A pump as claimed in claim 2 wherein the first seal disc includes a central disc portion,
the elastically deformable edge portion of the first seal disc extending radially outwardly and axially outwardly from the central disc portion,
the edge portion being elastically deformable radially inwardly away from the chamber wall to permit fluid flow in the chamber outwardly past the first seal disc.

16. A pump as claimed in claim 15 wherein the first locating disc is carried on the central disc portion and extends radially outwardly from the central disc portion.

17. A pump for dispensing fluid from a reservoir, comprising:
a piston chamber-forming member having a cylindrical chamber, said chamber having a chamber wall, an outer open end and an inner end in fluid communication with the reservoir;
a piston-forming element slidably received in the chamber extending outwardly from the open end thereof;
said the piston-forming element being generally cylindrical in cross-section with a central axially extending stem having an inner end in the chamber and extending from the inner end outwardly to an outer end;
a first seal disc extending radially outwardly from the stem proximate the inner end, the first seal disc having an elastically deformable edge portion proximate the chamber wall circumferentially thereabout, wherein in operation: (a) on the piston forming element sliding outwardly in said chamber, the first seal disc substantially preventing fluid flow past the first seal disc in an inward direction, and (b) on the piston forming element sliding inwardly into the chamber the first seal disc elastically deforms away from the chamber wall to permit fluid flow past the first seal disc in an outward direction;
a first locating disc on said stem located axially on the stem proximate to the first seal disc, the first locating disc extending radially outwardly from the stem to an edge portion which engages the chamber wall over a circumferential sector greater than 180 degrees to guide the piston- forming element in sliding axially centered and aligned within the chamber, the first locating disc having an opening axially therethrough permitting fluid flow past the first locating disc in both an inward direction and an outward direction,
wherein the first locating disc is on the stem axially inward of the first seal disc.

18. A pump as claimed in claim 17 wherein the first locating disc having an edge portion proximate the chamber wall substantially circumferentially thereabout, the opening axially through the first locating disc comprising a slot axially through the locating disc extending from the edge portion radially toward the stem.

19. A pump as claimed in claim 3 wherein the first locating disc having an edge portion proximate the chamber wall substantially circumferentially thereabout, the opening axially through the first locating disc comprising a slot axially through the locating disc extending from the edge portion radially toward the stem.

20. A pump as claimed in claim 15 wherein the first locating disc having an edge portion proximate the chamber wall substantially circumferentially thereabout, the opening axially through the first locating disc comprising a slot axially through the locating disc extending from the edge portion radially toward the stem.

* * * * *